United States Patent
Ohnishi

(10) Patent No.: US 8,742,979 B2
(45) Date of Patent: Jun. 3, 2014

(54) RANGE SIDE LOBE REMOVAL DEVICE, SIGNAL-PROCESSING DEVICE, RADAR DEVICE PROVIDED WITH THE SIGNAL-PROCESSING DEVICE, AND METHOD OF REMOVING RANGE SIDE LOBE

(75) Inventor: Yoshifumi Ohnishi, Nishinomiya (JP)

(73) Assignee: Furuno Electric Company Limited, Nishinomiya (JP)

(*) Notice: Subject to any disclaimer, the term of this patent is extended or adjusted under 35 U.S.C. 154(b) by 293 days.

(21) Appl. No.: 13/444,724

(22) Filed: Apr. 11, 2012

(65) Prior Publication Data

US 2012/0262332 A1    Oct. 18, 2012

(51) Int. Cl.
  *G01S 13/28*  (2006.01)
  *G01S 7/292*  (2006.01)
  *G01S 13/00*  (2006.01)
  *G01S 7/00*  (2006.01)

(52) U.S. Cl.
  USPC ........... 342/162; 342/118; 342/128; 342/130; 342/131; 342/132; 342/134; 342/135; 342/145; 342/159; 342/175; 342/194; 342/195; 342/196; 342/350; 342/378; 342/379

(58) Field of Classification Search
  USPC ............... 342/13–20, 89–103, 118, 128–145, 342/159–175, 192–197, 200–204, 350, 342/378–384; 235/400, 411
  See application file for complete search history.

(56) References Cited

U.S. PATENT DOCUMENTS

| | | | | |
|---|---|---|---|---|
| 3,281,842 A | * | 10/1966 | Cerar et al. | 342/201 |
| 3,786,504 A | * | 1/1974 | Collins | 342/192 |
| 3,889,199 A | * | 6/1975 | Gutleber | 342/201 |
| 4,021,805 A | * | 5/1977 | Effinger et al. | 342/381 |
| 4,028,700 A | * | 6/1977 | Carey et al. | 342/194 |
| 4,044,359 A | * | 8/1977 | Applebaum et al. | 342/379 |
| 4,086,592 A | * | 4/1978 | Lewis et al. | 342/381 |
| 4,095,225 A | * | 6/1978 | Erikmats | 342/195 |
| 4,180,205 A | * | 12/1979 | Schwartz | 235/411 |
| 4,333,080 A | * | 6/1982 | Collins et al. | 342/194 |
| 4,384,291 A | * | 5/1983 | Lewis et al. | 342/196 |
| 4,507,659 A | * | 3/1985 | Lewis et al. | 342/201 |
| 4,566,010 A | * | 1/1986 | Collins | 342/201 |
| 4,586,048 A | * | 4/1986 | Downie | 342/379 |
| 5,151,702 A | * | 9/1992 | Urkowitz | 342/134 |
| 5,173,706 A | * | 12/1992 | Urkowitz | 342/135 |
| 5,309,161 A | * | 5/1994 | Urkowitz et al. | 342/132 |
| 5,414,428 A | * | 5/1995 | Gallagher et al. | 342/132 |

(Continued)

FOREIGN PATENT DOCUMENTS

| | | |
|---|---|---|
| JP | 2982769 B2 | 11/1999 |
| JP | 2009-128278 A | 6/2009 |

*Primary Examiner* — Bernarr Gregory
(74) *Attorney, Agent, or Firm* — Birch, Stewart, Kolasch & Birch, LLP

(57) ABSTRACT

This disclosure provides a range side lobe removal device, which includes a pulse compressor for acquiring a reception signal from a radar antenna and generating a pulse-compressed signal by performing a pulse compression of the reception signal, a pseudorange side lobe generator for generating a pseudo signal of range side lobes of the pulse-compressed signal based on the reception signal, and a signal remover for removing a component corresponding to the pseudo signal from the pulse-compressed signal.

17 Claims, 12 Drawing Sheets

(56) References Cited

U.S. PATENT DOCUMENTS

| | | | |
|---|---|---|---|
| 5,440,311 A * | 8/1995 | Gallagher et al. | 342/132 |
| 5,481,270 A * | 1/1996 | Urkowitz et al. | 342/162 |
| 5,786,788 A * | 7/1998 | Schober et al. | 342/159 |
| 6,121,914 A * | 9/2000 | Cavelos et al. | 342/379 |
| 6,297,772 B1 * | 10/2001 | Lewis | 342/381 |
| 7,129,888 B1 * | 10/2006 | Chesley | 342/159 |
| 7,298,315 B2 * | 11/2007 | Gerlach et al. | 342/159 |
| 7,492,312 B2 * | 2/2009 | Fam et al. | 342/159 |
| 7,561,100 B2 * | 7/2009 | Shinonaga | 342/204 |
| 7,843,382 B2 * | 11/2010 | Fam et al. | 342/175 |

* cited by examiner

RECEPTION SIGNAL

ABSOLUTE VALUE
CALCULATING MODULE
OUTPUT SIGNAL

AVERAGE VALUE
CALCULATING MODULE
OUTPUT SIGNAL

FUNCTION CALCULATING
MODULE OUTPUT SIGNAL

DELAY DEVICE
OUTPUT SIGNAL

WITHOUT RANGE SIDE LOBE REMOVE PROCESSING

RANGE SIDE LOBE REMOVAL DEVICE, SIGNAL-PROCESSING DEVICE, RADAR DEVICE PROVIDED WITH THE SIGNAL-PROCESSING DEVICE, AND METHOD OF REMOVING RANGE SIDE LOBE

CROSS-REFERENCE TO RELATED APPLICATION(S)

The application claims priority under 35 U.S.C. §119 to Japanese Patent Application No. 2011-089415, which was filed on Apr. 13, 2011, the entire disclosure of which is hereby incorporated by reference.

TECHNICAL FIELD

The present invention relates to a technique for a radar device which detects a reflective object by a pulse-shaped radio wave, and, more particularly to a technique to reduce range side lobes of a pulse-compressed signal.

BACKGROUND OF THE INVENTION

Conventional radar devices utilize a pulse compression in order to improve an S/N ratio or a distance resolution of a reception signal. The pulse compression uses a transmission signal modulated by frequency modulation or code modulation. The pulse compression is performed based on a correlation between a corresponding reception signal and a reference signal generated based on the transmission signal. By using the pulse compression, the S/N ratio and the resolution of the reception signal improve; however, range side lobes occur, resulting in a false image.

For example, JP2009-128278A and JP2982769B disclose some methods of reducing such range side lobes.

FIG. 12 shows a waveform of a signal containing target objects A, B, and C of which reception signal strengths are different. A threshold T1 is set to detect the target objects and is set higher than a maximum of range side lobes of the target object A. Thus, the threshold T1 is not influenced by the range side lobes, and, therefore, the target objects A and B can be detected from a radar image without any problems. However, it is impossible to detect the target object C of which reception signal strength is smaller than the threshold T1. For this reason, in order to detect such a weak reception signal from the target object C as well, a second threshold T2 may be set. However, in turn, the threshold T2 alone cannot be used for the detection of the target object B which overlaps with the range side lobes.

SUMMARY OF THE INVENTION

The present invention is made in view of above situation, and provides a technique to reduce a false image caused by range side lobes to allow a reliable detection of a target object.

According to one aspect of the invention, a range side lobe removal device is provided, which includes a pulse compressor for acquiring a reception signal from a radar antenna and generating a pulse-compressed signal by performing a pulse compression of the reception signal, a pseudorange side lobe generator for generating a pseudo signal of range side lobes of the pulse-compressed signal based on the reception signal, and a signal remover for removing a component corresponding to the pseudo signal from the pulse-compressed signal.

Therefore, since the (signal) component corresponding to the pseudo signal of the range side lobes generated based on the reception signal from the radar antenna is removed from the pulse-compressed signal, a false image caused by the range side lobes can be reduced and a target object can be certainly detected.

The pseudorange side lobe generator may generate the pseudo signal by shaping the reception signal into a waveform approximated to the range side lobe.

The pseudorange side lobe generator may include an average value calculating module for calculating an average (e.g., a moving average or a weighted average) of an envelope of the reception signal, and generate the pseudo signal based on the average.

The range side lobe removal device may further include a quadrature detector for carrying out a quadrature detection of the reception signal. The pseudorange side lobe generator may further include an absolute value calculating module for calculating an absolute value of the reception signal for which the quadrature detection is carried out by the quadrature detector, to acquire the envelope of the reception signal.

Alternatively, the range side lobe removal device may further include an envelope detector for acquiring the envelope of the reception signal by carrying out an envelope detection of the reception signal.

The pseudorange side lobe generator may generate the pseudo signal by attenuating the average of the envelope of the reception signal according to a signal level of the reception signal. In this case, the pseudorange side lobe generator may generate the pseudo signal by attenuating the average of the envelope of the reception signal according to a bandwidth-time (BT) product of the reception signal. The pseudorange side lobe generator may carry out a log transformation of the attenuated average of the envelope of the reception signal. The pseudorange side lobe generator may further add 1 (one) to the attenuated average of the envelope of the reception signal before carrying out the log transformation.

The pulse compressor may have a matched filter.

According to another aspect of the invention, a signal processing device is provided, which includes the range side lobe removal device, an A/D converter for converting the reception signal from the radar antenna into a digital form, and a detector (i.e., demodulator) for detecting an output of the A/D converter.

According to still another aspect of the invention, a radar device is provided, which includes a radar antenna and a transceiver for receiving a signal from the radar antenna and transmitting a signal via the radar antenna. The radar device also includes the signal processing device, and a display unit configured to display a radar image based on the signal from the signal processing device.

According to another aspect of the invention, a method of removing range side lobes is provided, which includes acquiring a reception signal from a radar antenna and generating a pulse-compressed signal by performing a pulse compression of the reception signal, calculating an average of an envelope of the reception signal, and generating a pseudo signal of the range side lobes of the pulse-compressed signal based on the average, and removing a component corresponding to the pseudo signal from the pulse-compressed signal.

Therefore, since the component corresponding to the pseudo signal of the range side lobes generated based on the reception signal from the radar antenna is removed from the pulse-compressed signal, a false image caused by the range side lobes can be reduced and a target object can be certainly detected.

According to another aspect of the invention, computer readable media configured to store in a non-transitory manner a computer executable program, which upon execution by a processor of a computer, causes the computer to remove range side lobes according to a method, is provided. The program includes acquiring a reception signal from a radar antenna and generating a pulse-compressed signal by performing a pulse compression of the reception signal, calculating an average of an envelope of the reception signal, and generating a pseudo signal of the range side lobes of the pulse-compressed signal based on the average. The program also includes removing a component corresponding to the pseudo signal from the pulse-compressed signal.

Therefore, since the component corresponding to the pseudo signal of the range side lobes generated based on the reception signal from the radar antenna is removed from the pulse-compressed signal, a false image caused by the range side lobes can be reduced and a target object can be certainly detected.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, one embodiment of a radar device 1 according to the present invention is described with reference to the accompanying drawings.

In this embodiment, the radar device 1 is made for a ship and carried in the ship. The radar device 1 detects a position of a target object, such as another ship, a buoy, or a bird above a water surface.

Figure 1:
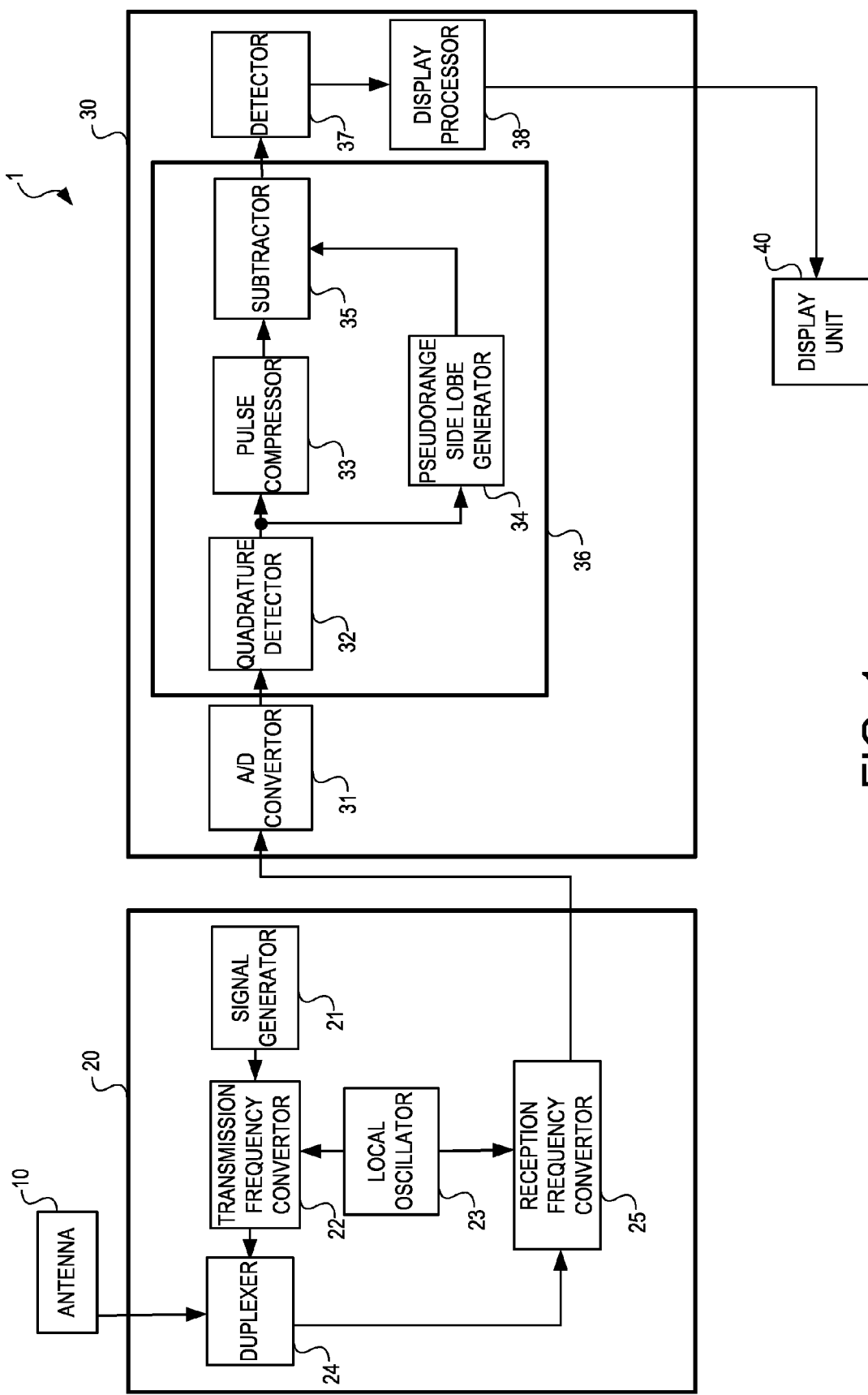
FIG. 1 shows an entire configuration of a radar device according to one embodiment of the present invention.

A configuration of the radar device 1 is described with reference to FIG. 1. FIG. 1 is a view schematically showing an entire configuration of the radar device 1.

As shown in FIG. 1, the radar device 1 includes an antenna 10, a transceiver 20, a signal processor 30, and a display unit 40. Next, each component of the radar device 1 is described in detail.

The antenna 10 transmits a beam of a radar transmission signal which is a pulse-shaped radio wave with narrow directivity, and receives a reflection wave from the target object around the ship (more specifically, around the antenna). The antenna 10 repeats the transmission and the reception, while rotating in a horizontal plane.

The antenna 10 discharges the radar transmission signals concentrating in a certain direction to receive radar reception signals containing target object signals which are the reflection waves from the target objects. A distance from the radar device 1 to the target object can be calculated based on a time lag between a receiving time of the radar reception signal containing the target object signal and a transmitting time of the radar transmission signal corresponding to the radar reception signal. An azimuth of the target object can be calculated based on an azimuth of the antenna 10 when the corresponding radar transmission signal is transmitted.

The transceiver 20 generates the radar transmission signal and sends it out to the antenna 10. The transceiver 20 takes in the radar reception signal from the antenna 10, and carries out a frequency conversion of the radar reception signal. In this embodiment, the transceiver 20 includes a signal generator 21, a transmission frequency convertor 22, a local oscillator 23, a duplexer 24, and a reception frequency convertor 25.

The signal generator 21 generates the radar transmission signal of an intermediate frequency and outputs it to the transmission frequency convertor 22, at a constant time interval or a varying time interval. The radar transmission signal generated by the signal generator 21 may be a frequency modulated signal known as a chirp signal. The radar device 1 may still have the same configuration even when the signal generator 21 is configured to generate a phase modulation signal or a non-modulated pulse.

The transmission frequency convertor 22 mixes the output signal of the signal generator 21 with a local signal outputted from the local oscillator 23 to carry out a frequency conversion of the output signal of the signal generator 21, and then outputs it to the duplexer 24.

The duplexer 24 is configured connectable with the antenna 10. The duplexer 24 switches signals between the antenna 10 and the transceiver 20. Specifically, upon transmission, the duplexer 24 inhibits the radar transmission signal from entering into reception circuitry (i.e., the reception frequency convertor 25), and, upon reception, it inhibits the radar reception signal from entering into transmission circuitry (i.e., the transmission frequency convertor 22). As the duplexer 24, an electronic component, such as a circulator, may be used.

The reception frequency convertor 25 takes in the radar reception signal outputted from the antenna 10 via the duplexer 24. Then, the reception frequency convertor 25 mixes the radar reception signal with the local signal outputted from the local oscillator 23 to carry out a frequency conversion of the radar reception signal. The frequency-converted signal is outputted to the signal processor 30.

Note that illustration of an amplifier and a filter is omitted in the transceiver 20 of FIG. 1.

Figure 3A:
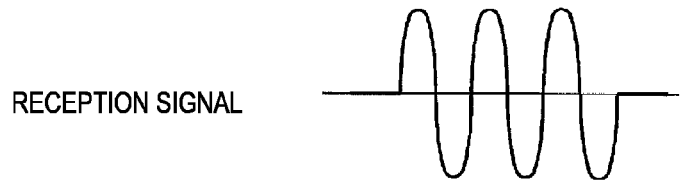
FIGS. 3A to 3E are simplified charts showing waveforms of a reception signal and output signals from each component of a pseudorange side lobe generator in the range side lobe remover.

The signal processor 30 converts the radar reception signal inputted from the transceiver 20 (e.g., FIG. 3A) into a digital signal to perform signal processing. The signal processor 30 includes an A/D (analog to digital) converter 31, a range side lobe remover 36, a detector 37, and a display processor 38.

The A/D converter 31 converts the analog intermediate frequency signal outputted from the reception frequency convertor 25 of the transceiver 20 into a digital signal.

As described later in detail, the range side lobe remover 36 performs a pulse compression of a complex reception signal Z outputted from the quadrature detector 32, and generates a pseudo signal of range side lobes (hereinafter, referred to as "the range side lobe pseudo signal") of I and Q signals outputted from the quadrature detector 32. Then, the range side lobe remover 36 subtracts a component corresponding to the range side lobe pseudo signal from the pulse-compressed signal.

The detector 37 detects the signal outputted from the range side lobe remover 36 (hereinafter, referred to as "the range side lobe removed signal").

The display processor 38 generates a signal to display, based on the signal inputted from the detector 37, and outputs it to the display unit 40.

The display unit 40 includes devices, such as a CPU, a memory, and an input device, which are not illustrated. The display unit 40 stores amplitude data S' obtained from each sweep in the display memory, and is configured to read the stored data from the memory in a given order to display the series of data on an LCD (Liquid Crystal Display) as a radar image.

Still referring to FIG. 1, the range side lobe remover 36 includes a quadrature detector 32, a pulse compressor 33, a pseudorange side lobe generator 34, and a subtractor 35 (signal remover). Hereinafter, each component of the range side lobe remover 36 is described in detail.

Figure 2:
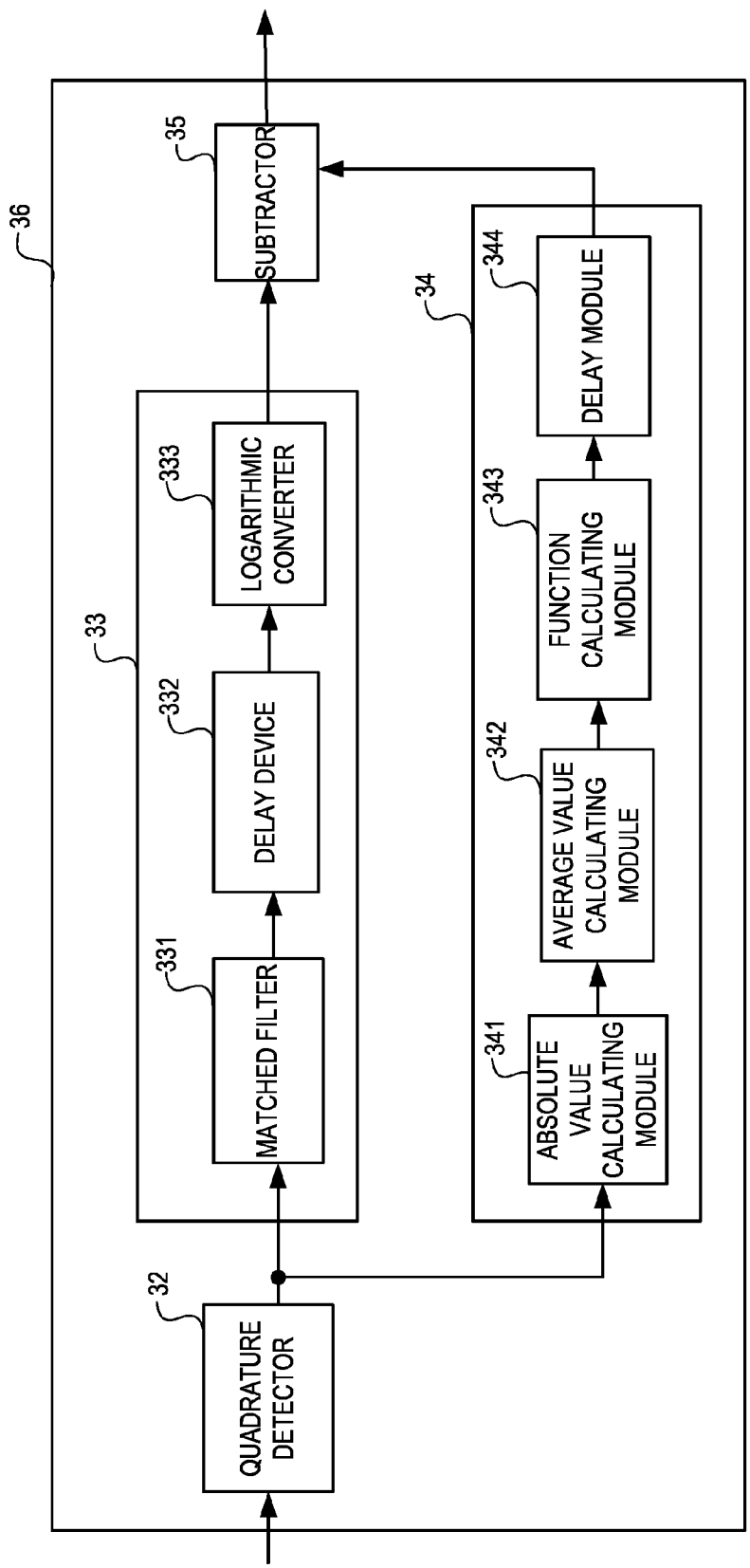
FIG. 2 shows a configuration of a range side lobe remover shown in FIG. 1.

FIG. 2 shows a detailed configuration of the range side lobe remover 36.

The quadrature detector 32 carries out a quadrature detection of the intermediate frequency signal of the digital value outputted from the A/D converter 31. Specifically, the quadrature detector 32 generates, from the radar reception signal of the output of the A/D converter 31, the I (in-phase) signal in the same phase as the radar reception signal, and the Q (quadrature) signal of which a phase differs from the radar reception signal by $\pi/2$. Here, the I signal and the Q signal (hereinafter, may be abbreviated as "I" and "Q," respectively) are a real number part and an imaginary number part of the complex reception signal Z which is the radar reception signal, respectively. An amplitude of the complex reception signal Z can be expressed by $(I^2+Q^2)^{1/2}$, and a phase of the complex reception signal Z can be expressed by $\tan^{-1}(Q/I)$.

The pulse compressor 33 performs a pulse compression of the complex reception signal Z outputted from the quadrature detector 32, and outputs the pulse-compressed signal. Still referring to FIG. 2, the pulse compressor 33 includes a matched filter 331, a delay device 332, and a logarithmic converter 333.

The matched filter 331 takes in the output signals I and Q of the quadrature detector 32, and compresses the taken-in complex reception signal Z. The resolution of the radar image displayed on the display unit 40 becomes high by the compression of the pulse width. This pulse compression is performed by a correlation operation between the reference signal based on the transmission signal, and the reception signal.

The delay device 332 is inputted with the output signal of the matched filter 332, and matches it in timing with the output signal of the pseudorange side lobe generator 34, as described later.

Figure 4:
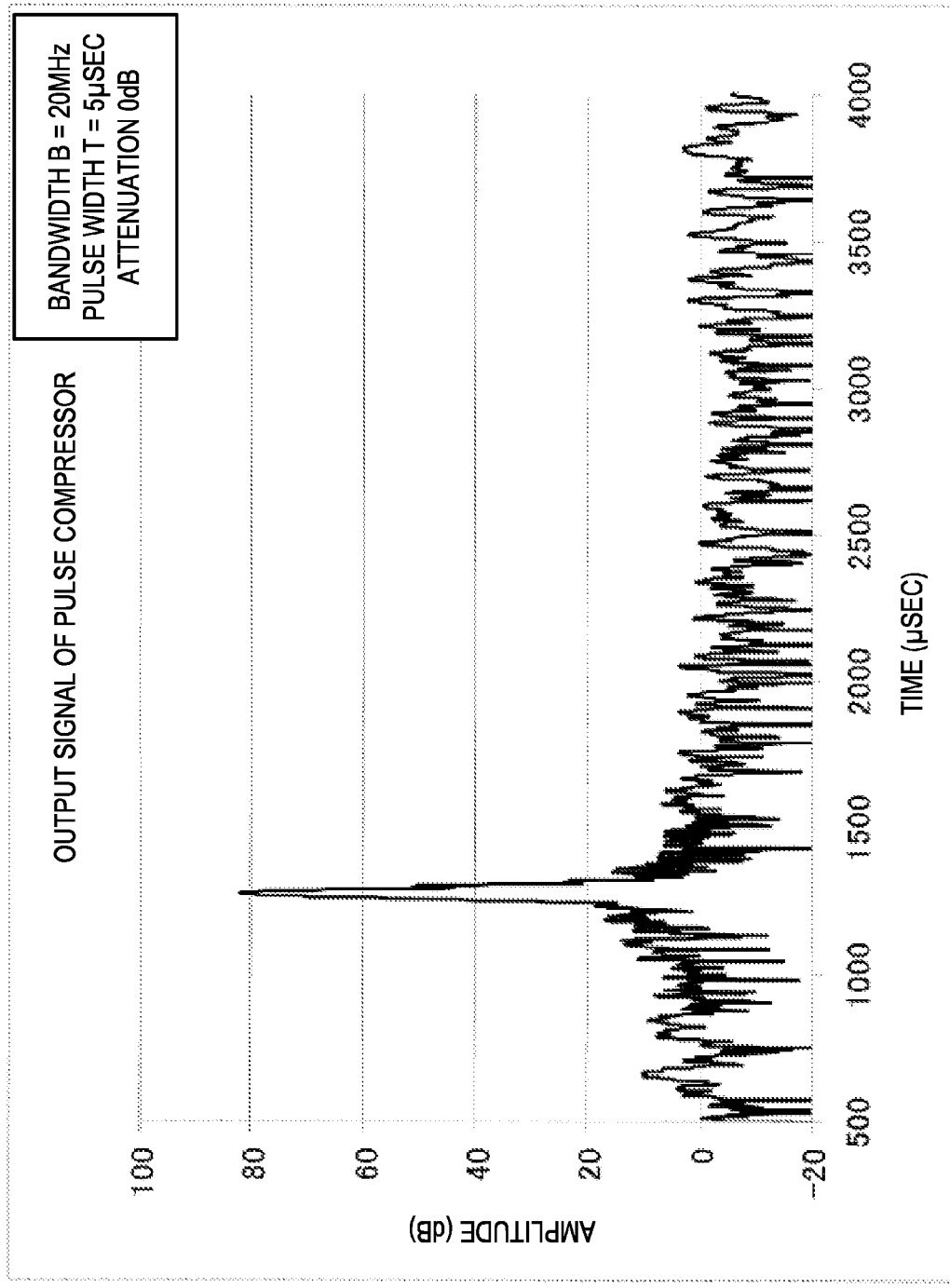
FIG. 4 is a graph showing an example of the output signal of a pulse compressor in the range side lobe remover.
Figure 5:
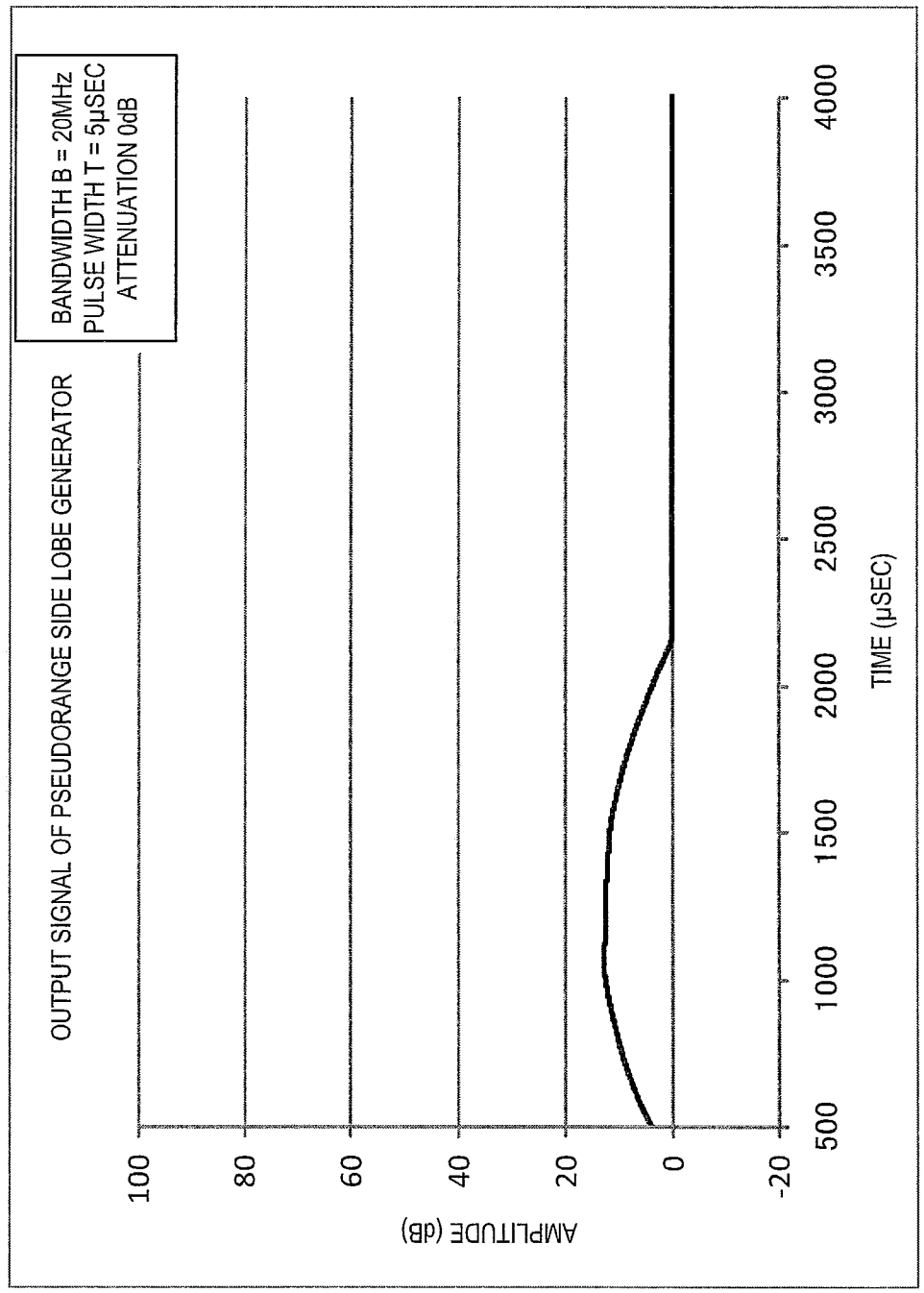
FIG. 5 is a graph showing an example of the output signal of a pseudorange side lobe generator in the range side lobe remover.
Figure 6:
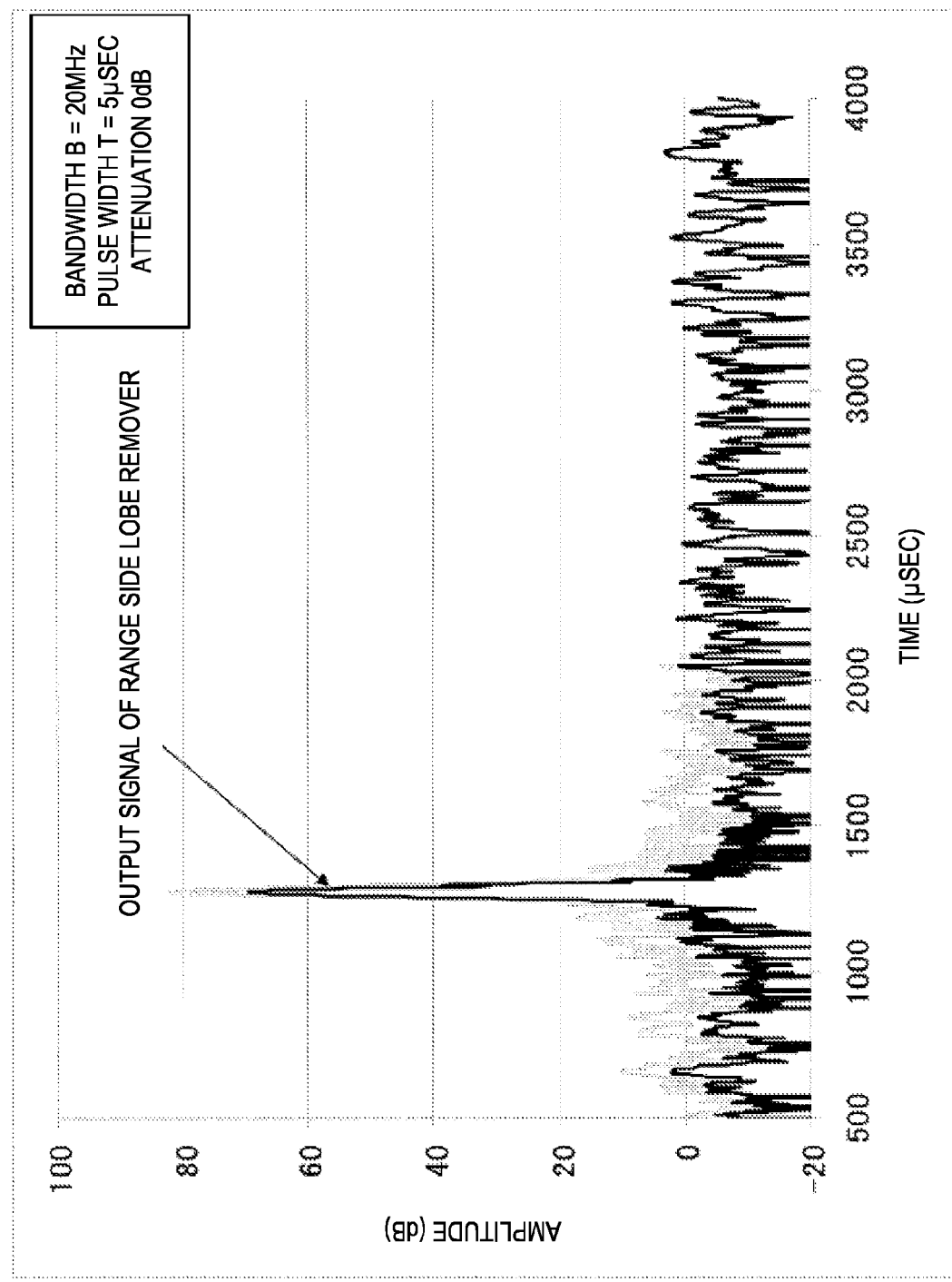
FIG. 6 is a graph showing an output signal of the range side lobe remover as compared with an output signal when not carrying out remove processing of range side lobes.

The logarithmic converter 333 carries out a log transformation of the output signal of the delay device 332. The output signal outputted from the logarithmic converter 333 (i.e., the pulse-compressed signal) turns into an output signal as shown in FIG. 4, for example. As shown in FIG. 4, range side lobes appear in the output signal. Note that the output signal shown in FIGS. 4-6 shows a signal based on the reception signal when a bandwidth is 20 MHz, a pulse width is 5 μs, and an amount of attenuation by an attenuator is 0 dB.

The pseudorange side lobe generator 34 generates the range side lobe pseudo signal of the pulse-compressed signal described above. Here, the range side lobe pseudo signal is, among the pulse-compressed signals shown in FIG. 4, a pseudo signal generated corresponding to a signal component of the range side lobes. Returning to FIG. 2, the pseudorange side lobe generator 34 includes an absolute value calculating module 341, an average value calculating module 342, a function calculating module 343, and a delay module 344.

Figure 3B:
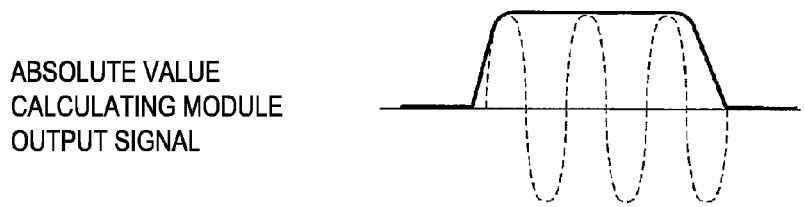

The absolute value calculating module 341 calculates the absolute values x(t) of the output signals I and Q from the quadrature detector to find an envelope as shown in FIG. 3B (positive portion of the signal), by the following equation. Note that, the waveform of the reception signal (FIG. 3A) is shown in FIG. 3B by a dotted line for a clear understanding; however, in this embodiment, the reception signal is converted into a digital signal, and an absolute value of the digitalized reception signal is calculated by the absolute value calculating module 341 to find the envelope.

$$x(t)=(I^2+Q^2)^{1/2}$$

Figure 3C:
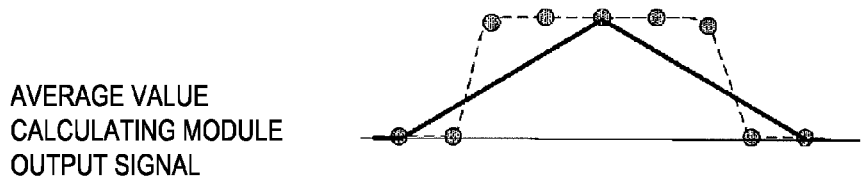

The average value calculating module 342 calculates a moving average of the absolute value x(t) with the following Equation (1) based on the output signal of the absolute value calculating module 341. The moving average corresponds to a value of TT which is obtained by multiplying a pulse length T by a predetermined coefficient α (a ratio of the moving average with respect to the pulse length T). By acquiring the moving average, a signal of a waveform as shown in FIG. 3C (solid line) can be acquired. The coefficient α is determined in advance, considering a design of hardware or other conditions.

Note that, the moving average is used in order to reduce computational load in this embodiment; however, a weighted average may also be used instead in order to bring the signal even closer to the waveform of the range side lobes.

$$\overline{x(t)}=\int^{t+TT}x(t)dt/TT\ TT=T*\alpha \quad (1)$$

The function calculating module 343 generates the range side lobe pseudo signal by the following Equations (2) and (3) based on the output signal of the average value calculating module 342. By Equation (2), a value PSL_est is obtained by adjusting a signal level of the moving average of x(t).

$$PSL\_est=\overline{x(t)}/\beta \quad (2)$$

Here, β is a rate of the attenuation of the signal, and is determined in advance, considering a design of hardware or other conditions. β has the following characteristics. Energy before the pulse compression (i.e., an integral value of the moving averages of the reception waveform before the pulse compression) matches with a peak value of the reception waveform after the pulse compression. Assuming that a ratio of the peak value of the pulse-compressed waveform to the range side lobes is 60 dB, a value obtained by dividing the moving average of the reception waveform before the pulse compression by $10^6$ becomes the pseudorange side lobes. β of Equation (2) becomes a value which expresses the range side lobe ratio approximately by an antilog.

β may also be a value according to a BT product (time-bandwidth product) of the reception signal.

In Equation (3), a log transformation is carried out by adding 1 (one) to the value PSL_est so that the value does not become a negative value when the reception signal strength is low.

$$PSL\_est\_log = 20 \cdot \log(PSL\_est + 1) \quad (3)$$

Figure 3D:

As a result, a signal of a waveform as shown simplified in FIG. 3D (solid line) can be acquired.

Figure 3E:

The delay device 344 matches the output signal of the function calculating module 343 in timing with the output signal of the pulse compressor 33. As a result, as shown simplified in FIG. 3E, a signal of a waveform (solid line) which is matched in timing with the output signal of the pulse compressor 33 can be acquired.

As a result of the above processing, a signal shaped into a waveform as shown in FIG. 5 is outputted. This signal is a pseudo signal of the range side lobes of the pulse-compressed signal shown in FIG. 4.

The subtractor 35 is inputted with the output signal of the pulse compressor 33 and the output signal of the pseudorange side lobe generator 34, and subtracts a component of the output signal of the pseudorange side lobe generator 34 from the output signal of the pulse compressor 33.

As a result of this processing, as shown by a dark line in FIG. 6, a signal from which the range side lobes are reduced (hereinafter, referred to as "the range side lobe removed signal") is outputted. This range side lobe removal signal is a signal obtained by subtracting a component corresponding to the pseudo signal of FIG. 5 from the pulse-compressed signal (a gray line) shown in FIG. 6. As shown in FIG. 6, it turns out that the signal from which the level of the side lobe is reduced can be acquired.

Figure 7:
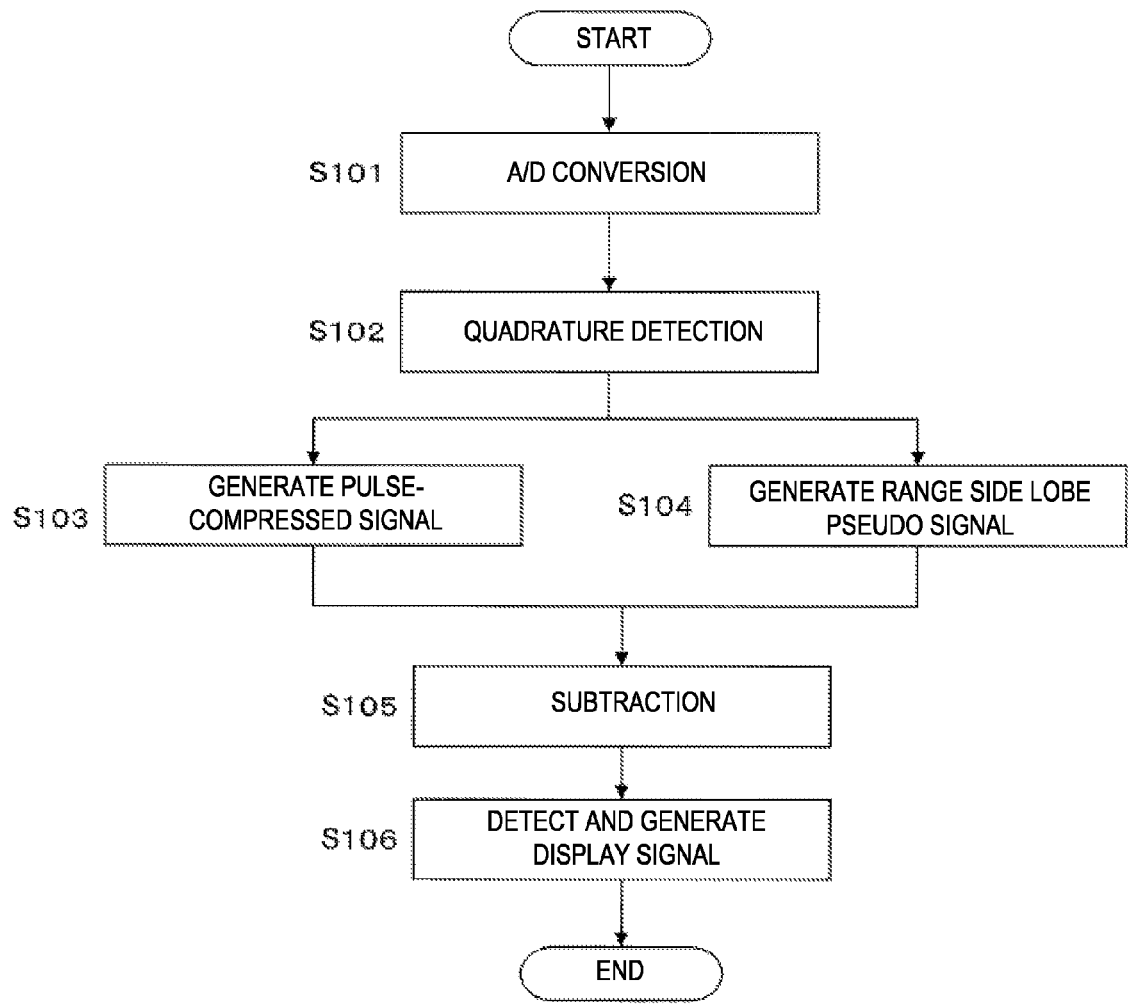
FIG. 7 is a flowchart showing an operation of the signal processing device according to this embodiment.

Next, an operation of the signal processor 30 is described, referring to a flowchart of FIG. 7.

S101: The reception signal from the transceiver 20 is converted into the digital signal by the A/D converter 31 of the signal processor 30.

S102: The quadrature detection of the digital signal outputted from the A/D converter 31 is carried out by the quadrature detector 32 to generate the I and Q signals.

S103: The I and Q signals are correlation processed using the matched filter 331 of the pulse compressor 33, and, for example, the pulse-compressed signal shown in FIG. 4 is generated.

S104: Meanwhile, the pseudorange side lobe generator 34 generates the range side lobe pseudo signal as shown in FIG. 5, based on the received I and Q signals.

S105: The subtractor 35 subtracts the component of the pseudo signal which is the output signal of the pseudorange side lobe generator 34 from the pulse-compressed signal. As a result of this processing, the range side lobe removal signal as shown by the dark line in FIG. 6 can be acquired.

S106: The detector 37 detects the range side lobe removal signal outputted from the range side lobe remover 36 and, further, a signal to be displayed is further generated based on the detected signal by the display processor 38, and is outputted to the display unit 40.

The above flow of processing by the signal processor 30 is merely an example and, therefore, the order and the timing of the processing are not limited to the order and the timing described above.

As described above, according to the radar device 1 of this embodiment, the signal from which the range side lobes are reduced can be acquired by subtracting the component corresponding to range side lobe pseudo signal from the pulse-compressed signal by the range side lobe remover 36. Therefore, the influence of the range side lobes can be eliminated and the detection performance of the target object(s) can be improved.

Since the range side lobe pseudo signal is generated based on the reception signal before carrying out the pulse compression, the signal corresponding to the range side lobes can be generated more simply and more certainly as compared with the conventional method.

Figure 8:
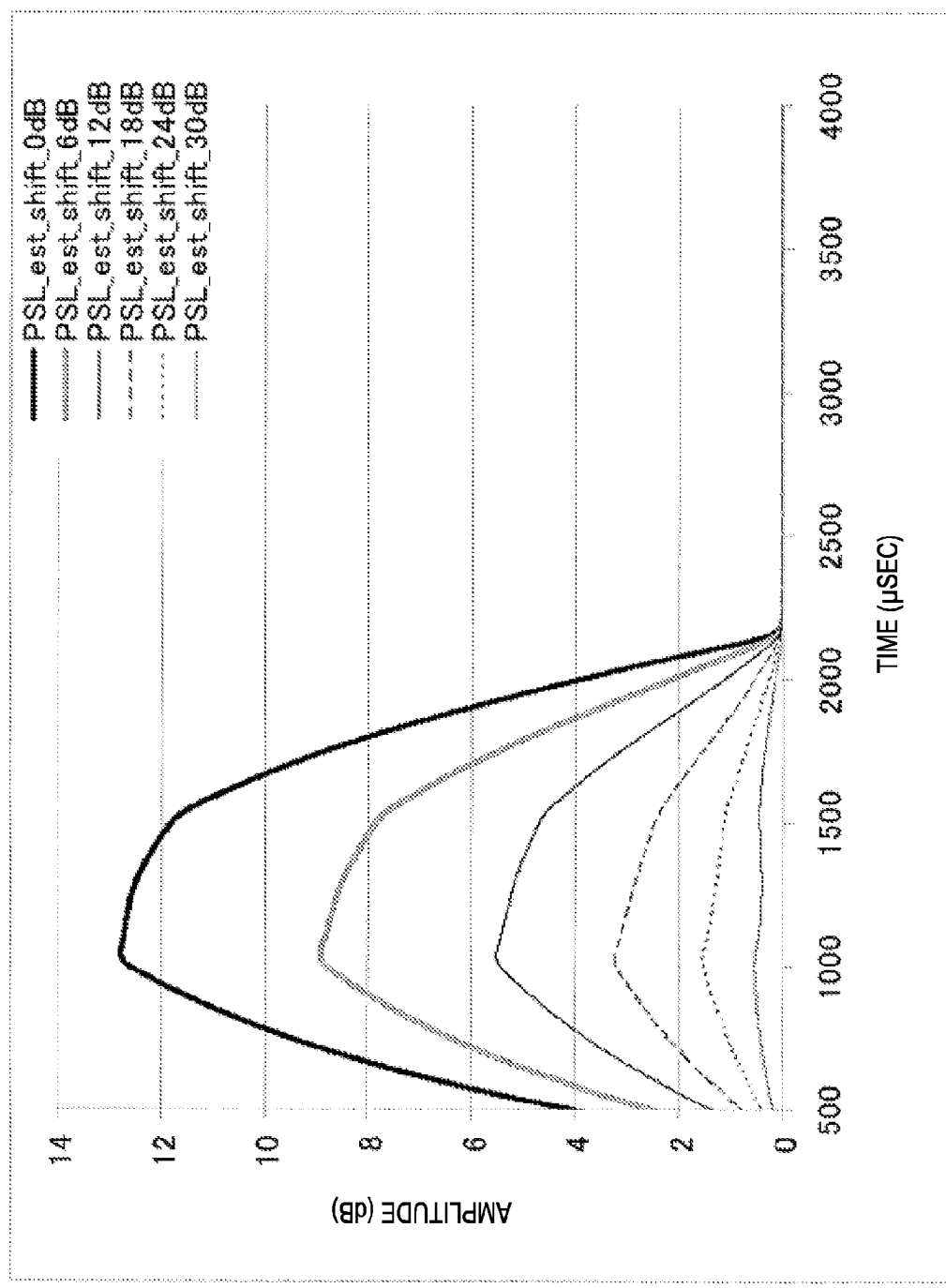
FIG. 8 is a graph showing an example of the output signal of the pseudorange side lobe generator, in accordance with reception signal strength.

The influence by the small reception signal strength does not occur in the above embodiment. FIG. 8 shows a waveform of the range side lobe pseudo signal generated according to the above embodiment when changing an input electric power (when attenuating by 6 dB from 0 dB to 30 dB). The level of the pseudo signal also changes according to the input electric power level. Therefore, the small-level reception signal which is not ever influenced by the range side lobes will not be influenced by the range side lobe remove processing of this embodiment.

Figure 9:
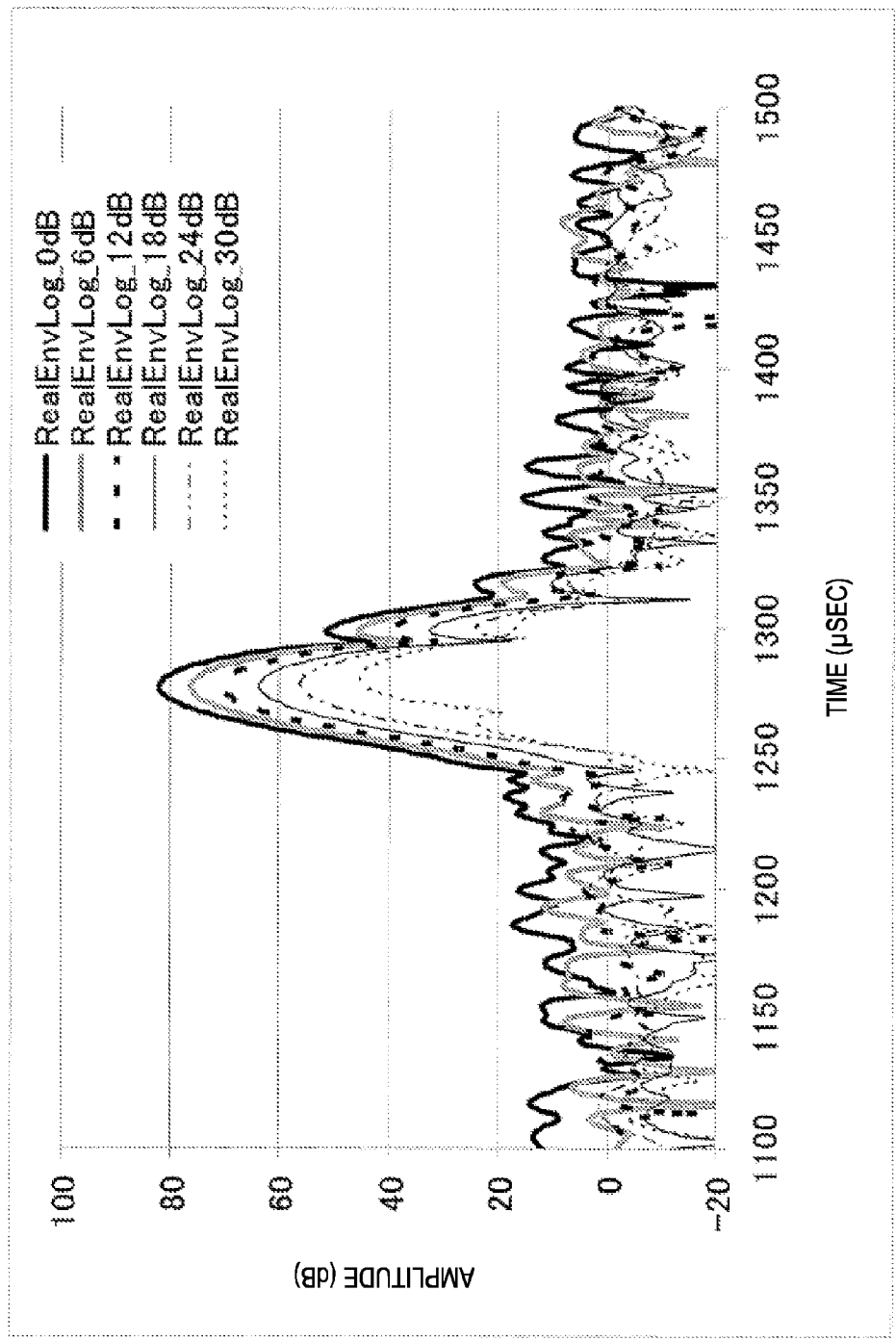
FIG. 9 shows output signals after pulse compression in accordance with the reception signal strength when not carrying out the remove processing of range side lobes.
Figure 10:
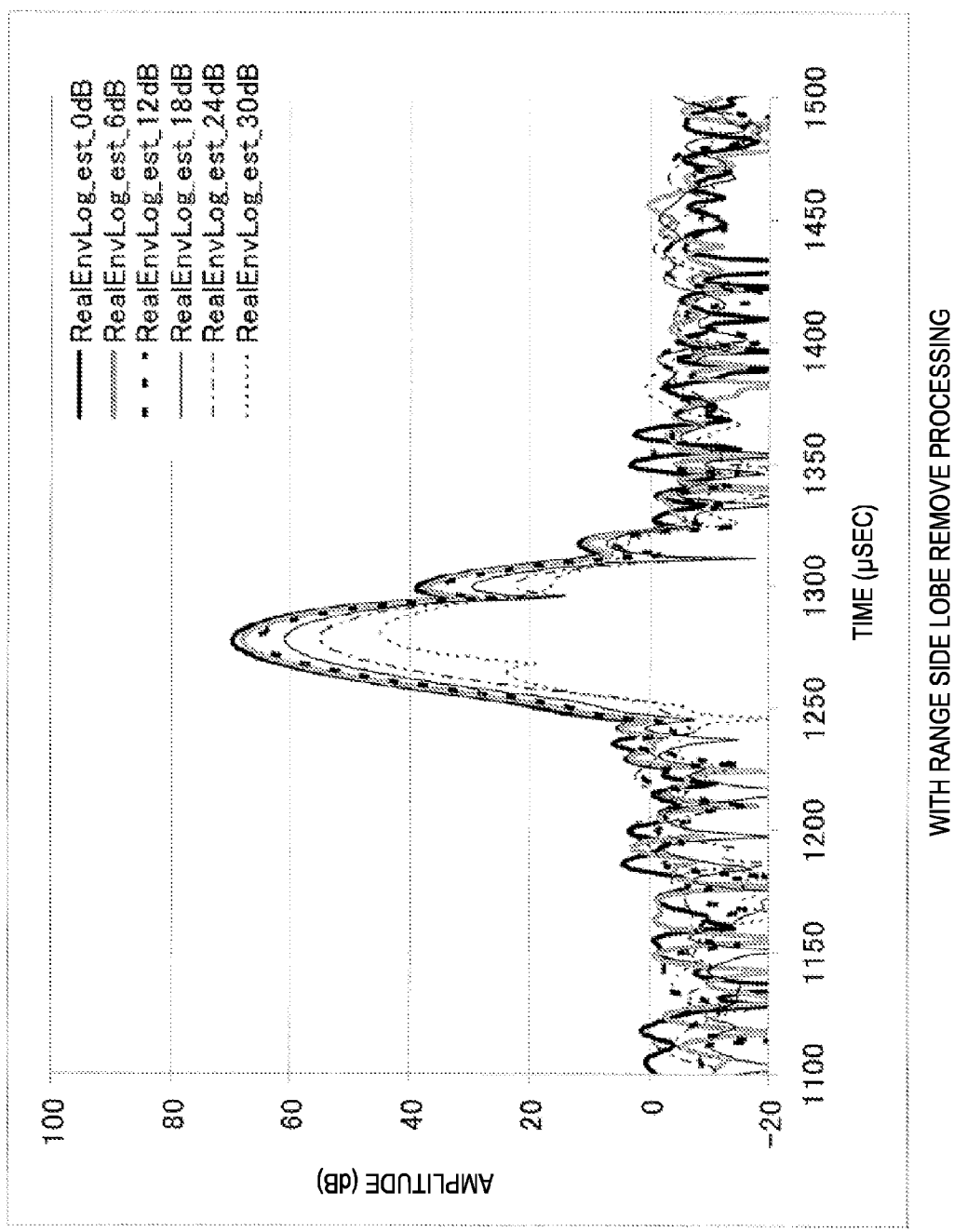
FIG. 10 shows output signals after the pulse compression in accordance with the reception signal strength when carrying out the remove processing of the range side lobe according to this embodiment.

FIGS. 9 and 10 show a pulse-compressed waveform (near a peak) when not carrying out the range side lobe remove processing (FIG. 9) and a pulse-compressed waveform (near a peak) when carrying out the remove processing of by this embodiment (FIG. 10), respectively, when changing the input electric power (when attenuating by 6 dB from 0 dB to 30 dB). As comparing these waveforms, it turns out that the range side lobes are reduced in the signal waveform of FIG. 10 of which the reception signal strength is high (that is, less attenuation). On the other hand, in the signal waveform where the reception signal strength is low (that is, more attenuation), since the level of the range side lobes to be removed is also low, it turns out that parts where signal levels other than the peak are small are not influenced by the range side lobe remove processing.

As described above, according to this embodiment, the range side lobes can be reduced, without being influenced by the level of the reception signal strength.

In the above embodiment, the pseudorange side lobe generator 34 of the range side lobe remover 36 causes the average value calculating module 342 to calculate the moving average, and, after that, it causes the number calculating module 343 to attenuate the moving average; however, the present invention is not limited to this. For example, the pseudorange side lobe generator 34 may attenuate the reception signal before calculating the average value.

In the above embodiment, the range side lobe remover 36 includes the quadrature detector 32, and the envelope is acquired by calculating the absolute values of the output signals I and Q outputted from the quadrature detector 32. However, the present invention is not limited to this.

Figure 11:
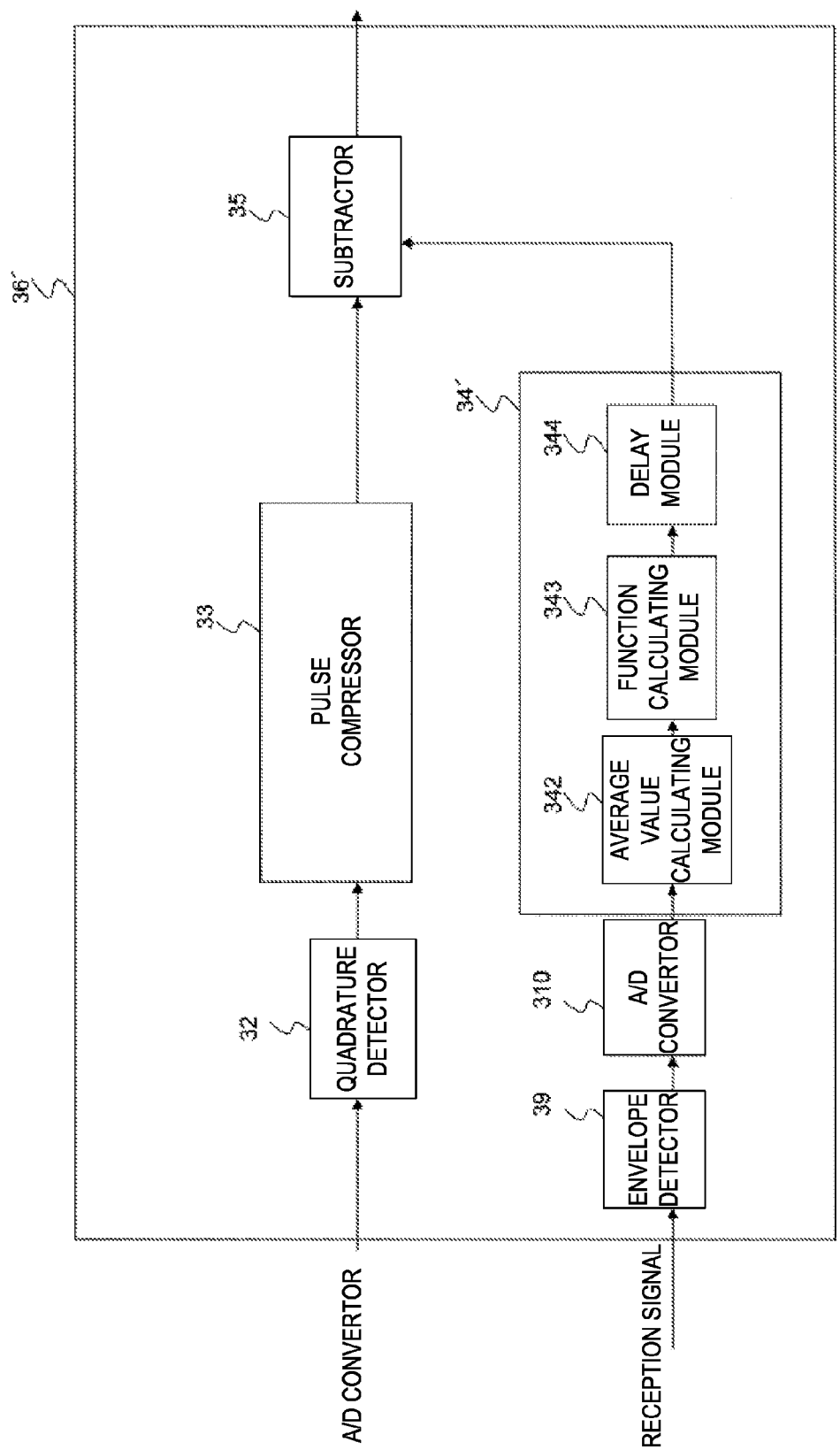
FIG. 11 shows a configuration of a range side lobe remover according to another embodiment of the invention.
Figure 12:
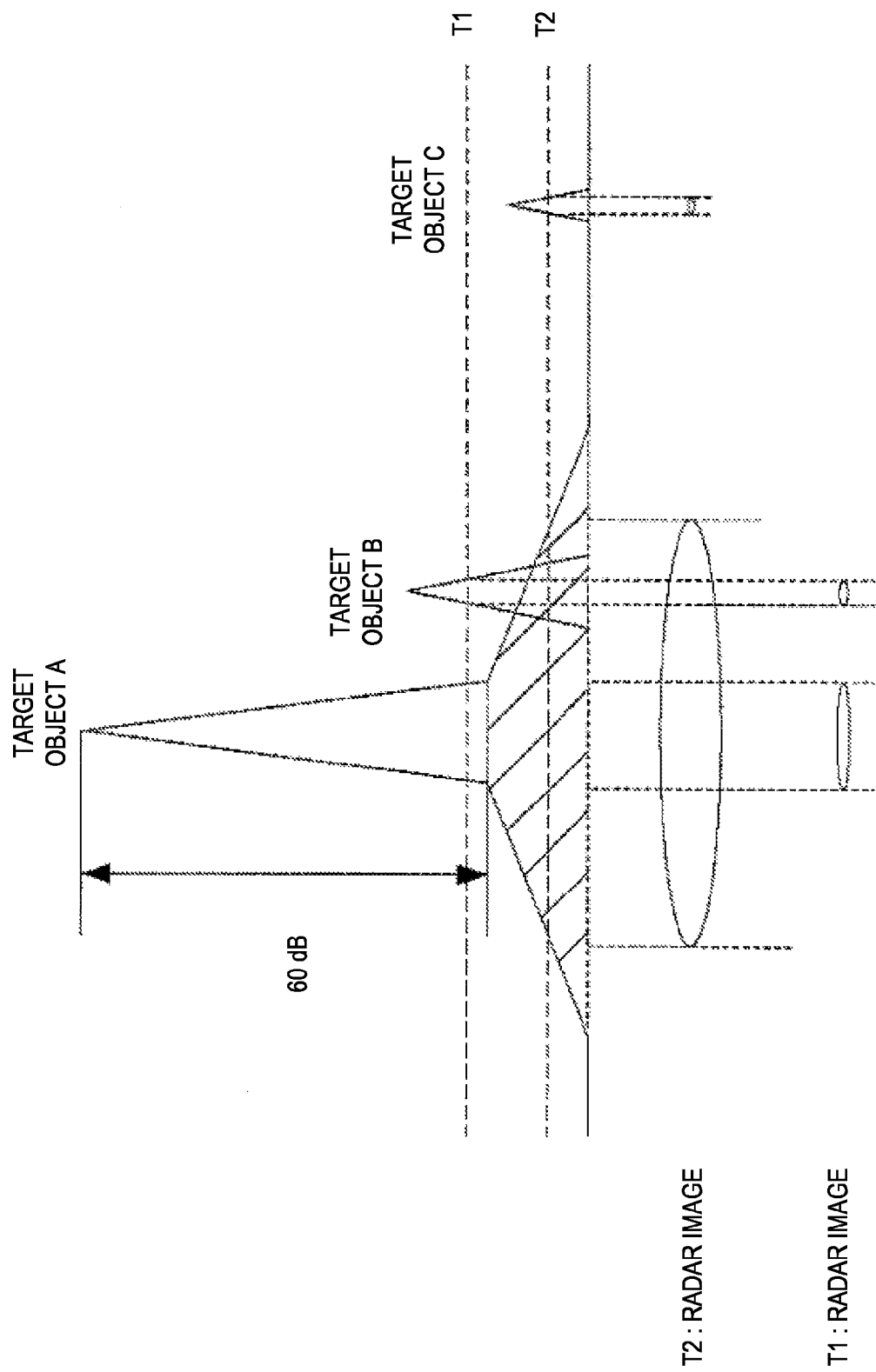
FIG. 12 is a view for illustrating range side lobes.

FIG. 11 shows a configuration of a range side lobe remover 36' according to another embodiment. The range side lobe remover 36' includes a quadrature detector 32, a pulse compressor 33, an envelope detector 39, an A/D convertor 310, a pseudorange side lobe generator 34', and a subtractor 35. Like reference numerals denote components having similar configurations and functions to the previous embodiment.

The range side lobe remover 36' of this embodiment differs from the previous embodiment in that it is provided with the envelope detector 39. The envelope detector 39 is inputted with a reception signal (analog signal), and acquires an output signal showing an envelope by detecting the envelope of the reception signal. After the output signal of the envelope detector 39 is converted into a digital signal by the A/D convertor 310, it is inputted into the pseudorange side lobe generator 34'. Since the signal of the envelope is acquired by the envelope detector 39, the pseudorange side lobe generator 34' does not need the absolute value calculating module like the previous embodiment. Therefore, the signal inputted into the pseudorange side lobe generator 34' is directly inputted into an average value calculating module 342. Then, a range side lobe pseudo signal is generated like the previous embodiment.

Other configurations and functions are similar to those of the previous embodiment.

In the previous embodiment, the radar device 1 is provided with the antenna 10, the transceiver 20, the signal processor 30, and the display unit 40. Alternatively, the radar device 1 may be provided only with the signal processor 30 (e.g., in a form of an integrated circuit, a semiconductor, a module, or a chip), or may be provided only with the transceiver 20 and the signal processor 30 (e.g., in a form of an integrated circuit, a semiconductor, a chip, or a module).

In the above embodiments, the invention is implemented as the radar device 1 or the integrated circuit. However, the invention may also be implemented as a method of removing range side lobe or as a computer program. In this case, the above remove processing of the range side lobes is performed by a processor executing a predetermined program stored in an internal or external memory (e.g., a ROM).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A range side lobe removal device, comprising:
    a pulse compressor for acquiring a reception signal from a radar antenna and generating a pulse-compressed signal by performing a pulse compression of the reception signal;
    a pseudorange side lobe generator for generating a pseudo signal of range side lobes of the pulse-compressed signal based on the reception signal; and
    a signal remover for removing a component corresponding to the pseudo signal from the pulse-compressed signal.

2. The range side lobe removal device of claim 1, wherein the pseudorange side lobe generator generates the pseudo signal by shaping the reception signal into a waveform approximated to the range side lobe.

3. The range side lobe removal device of claim 1, wherein the pseudorange side lobe generator includes an average value calculating module for calculating an average of an envelope of the reception signal, and generates the pseudo signal based on the average.

4. The range side lobe removal device of claim 3, further comprising a quadrature detector for carrying out a quadrature detection of the reception signal,
    wherein the pseudorange side lobe generator further includes an absolute value calculating module for calculating an absolute value of the reception signal for which the quadrature detection is carried out by the quadrature detector, to acquire the envelope of the reception signal.

5. The range side lobe removal device of claim 3, further comprising an envelope detector for acquiring the envelope of the reception signal by carrying out an envelope detection of the reception signal.

6. The range side lobe removal device of claim 3, wherein the pseudorange side lobe generator generates the pseudo signal by attenuating the average of the envelope of the reception signal according to a signal level of the reception signal.

7. The range side lobe removal device of claim 3, wherein the pseudorange side lobe generator generates the pseudo signal by attenuating the average of the envelope of the reception signal according to a bandwidth-time (BT) product of the reception signal.

8. The range side lobe removal device of claim 6, wherein the pseudorange side lobe generator carries out a log transformation of the attenuated average of the envelope of the reception signal.

9. The range side lobe removal device of claim 7, wherein the pseudorange side lobe generator carries out a log transformation of the attenuated average of the envelope of the reception signal.

10. The range side lobe removal device of claim 8, wherein the pseudorange side lobe generator further adds 1 (one) to the attenuated average of the envelope of the reception signal before carrying out the log transformation.

11. The range side lobe removal device of claim 9, wherein the pseudorange side lobe generator further adds 1 (one) to the attenuated average of the envelope of the reception signal before carrying out the log transformation.

12. The range side lobe removal device of claim 1, wherein the pulse compressor has a matched filter.

13. A signal processing device, comprising:
    a pulse compressor for acquiring a reception signal from a radar antenna and generating a pulse-compressed signal by performing a pulse compression of the reception signal;
    a pseudorange side lobe generator for generating a pseudo signal of range side lobes of the pulse-compressed signal based on the reception signal; and
    a signal remover for removing a component corresponding to the pseudo signal from the pulse-compressed signal;
    an A/D converter for converting the reception signal from the radar antenna into a digital form; and
    a detector for detecting an output from the A/D converter.

14. A radar device including a radar antenna and a transceiver for receiving a signal from the radar antenna and transmitting a signal via the radar antenna, comprising:
    the signal processing device of claim 13; and
    a display unit configured to display a radar image based on the signal from the signal processing device.

15. A method of removing range side lobes, comprising:
    acquiring a reception signal from a radar antenna and generating a pulse-compressed signal by performing a pulse compression of the reception signal;
    generating a pseudo signal of range side lobes of the pulse-compressed signal based on the reception signal; and
    removing a component corresponding to the pseudo signal from the pulse-compressed signal.

16. The method of removing range side lobes of claim 15, wherein the step of generating a pseudo signal generates the pseudo signal by shaping the reception signal into a waveform approximated to the range side lobe.

17. The method of removing range side lobes of claim 15, wherein the step of generating a pseudo signal includes calculating an average of an envelope of the reception signal, and generating the pseudo signal based on the average.

* * * * *